(12) United States Patent
Armbruster

(10) Patent No.: US 8,360,529 B2
(45) Date of Patent: Jan. 29, 2013

(54) VEHICLE SEAT ASSEMBLY WITH A SPRING-BIASED PIVOTABLE SEAT BACK

(75) Inventor: Chris Armbruster, White Lake, MI (US)

(73) Assignee: Lear Corporation, Southfield, MI (US)

( * ) Notice: Subject to any disclaimer, the term of this patent is extended or adjusted under 35 U.S.C. 154(b) by 233 days.

(21) Appl. No.: 12/911,420

(22) Filed: Oct. 25, 2010

(65) Prior Publication Data

US 2012/0098312 A1    Apr. 26, 2012

(51) Int. Cl.
*B60N 2/20* (2006.01)
(52) U.S. Cl. ............... 297/378.12; 297/354.12; 297/285
(58) Field of Classification Search .................. 297/285, 297/291, 296, 297, 354.12, 378.1, 378.12
See application file for complete search history.

(56) References Cited

U.S. PATENT DOCUMENTS

| | | | |
|---|---|---|---|
| 4,218,092 A | 8/1980 | Schach et al. | |
| 6,631,954 B2 | 10/2003 | Amorin et al. | |
| 7,281,766 B2 * | 10/2007 | Fujita et al. | 297/378.12 |
| 7,722,120 B2 | 5/2010 | Toyooka et al. | |
| 2002/0125757 A1 * | 9/2002 | LeTournoux | 297/378.12 |
| 2009/0096267 A1 | 4/2009 | Toyooka et al. | |
| 2011/0156462 A1 * | 6/2011 | Lim et al. | 297/354.12 |

FOREIGN PATENT DOCUMENTS

| | | |
|---|---|---|
| DE | 19906662 A1 | 9/2000 |
| DE | 19961655 A1 | 7/2001 |
| DE | 102004054165 B4 | 5/2006 |
| FR | 2677935 A1 | 12/1992 |
| JP | 1199029 A | 8/1989 |
| JP | 10157500 A | 6/1998 |

OTHER PUBLICATIONS

Office Action from the German Patent and Trademark Office; German Patent Application No. 10-2011 079 772.6; dated Apr. 23, 2012.

* cited by examiner

*Primary Examiner* — Peter R. Brown
(74) *Attorney, Agent, or Firm* — Brooks Kushman P.C.

(57) ABSTRACT

A vehicle seat assembly with a seat back mounted to pivot on a seat cushion by a recliner mechanism, and is urged forwardly by a torsion bar subassembly which has two ends fixed respectively to the seat back and to the seat cushion. The torsion bar subassembly urges the seat back to pivot forwardly for only a limited arcuate range of travel from a vertical position.

8 Claims, 3 Drawing Sheets

VEHICLE SEAT ASSEMBLY WITH A SPRING-BIASED PIVOTABLE SEAT BACK

TECHNICAL FIELD

The invention relates to a vehicle seat with a pivotable back that is urged forwardly by one or more torsion bars during a first segment of arcuate displacement.

BACKGROUND

U.S. Pat. No. 6,631,954 discloses a seat with a torsion bar that urges a seat back forwardly over its entire arcuate movement. JP-A-10 157 500 describes a seat with torsion bars that produce a return torque from a reclined to an upright position.

SUMMARY

The invention includes a vehicle seat assembly with two opposite sides and a back mounted on a seat cushion. The seat back pivots about a transverse horizontal pivot axis through a recliner mechanism that can be moved between two positions. The first is a locked position in which the recliner mechanism prevents the back from moving relative to the seat cushion. The second is an unlocked position in which the recliner mechanism allows the back to pivot relative to the seat cushion about the pivot axis.

In one embodiment, the seat back is urged forwards by means of one or more torsion bars. The one or more bars each include a wire which has two ends. The ends are fixed respectively to the seat back and to the seat cushion, at opposite sides of the seat.

One object of the present invention is to influence a tendency of a spring-loaded seat back to uncontrolledly downwardly.

Another aspect of the invention is that a torsion bar subassembly exerts a return torque over a limited range of angular positions of the seat back as it tumbles forwardly.

BRIEF DESCRIPTION OF THE DRAWINGS

FIG. 5 is a view of the left side of the seat on the left of FIG. 4. FIG. 6 is a view of the left side of the right hand seat of FIG. 4.

DETAILED DESCRIPTION

Detailed embodiments of the present invention are disclosed herein. It is to be understood that the disclosed embodiments exemplify the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

In the several figures, the same references are used to designate elements that are identical or similar.

Figure 1:
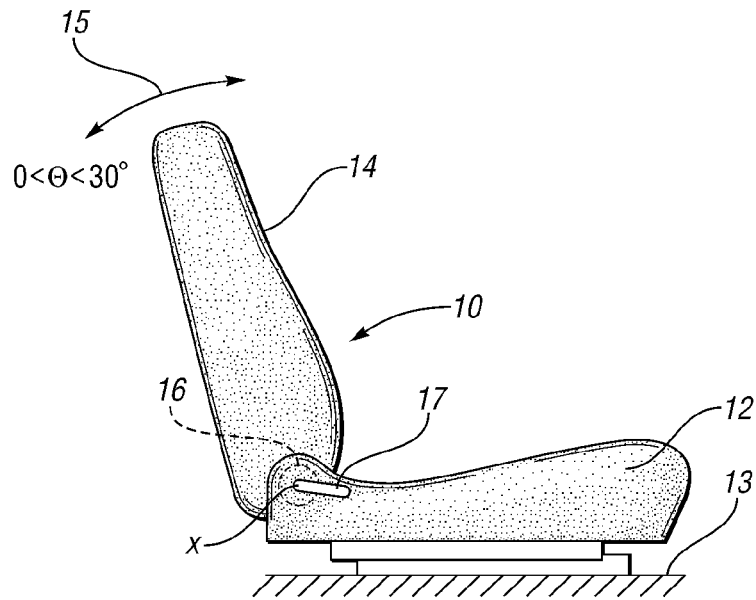
FIG. 1 is a side view of a vehicle seat assembly in an upright position.

FIG. 1 shows a motor vehicle seat assembly 10. It has a seat cushion 12 mounted on the vehicle floor 13, and supports a seat back 14. The seat back 14 pivots, as suggested by the double-headed arrow 15 about a transverse horizontal axis X-X, by means of a recliner mechanism 16 that is controlled by a handle 17.

The recliner mechanism 16 is movable by the handle 17 between a locked position in which the recliner mechanism 16 prevents the seat back 14 from pivoting relative to the seat cushion 12, and an unlocked position in which the seat back 14 may pivot relative to the seat cushion 12.

It is possible to adjust the upright position the seat back 14 by releasing the recliner mechanism 16 by displacing the handle 17 and then exerting a displacement force on the seat back 14. In use, the seat back is urged forwardly over a limited range of arcuate displacement by a torsion bar subassembly that is described later.

Figure 2:
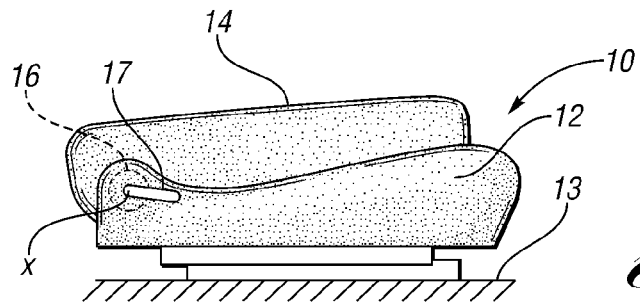
FIGS. 2 and 3 are views of the seat assembly respectively in its stowed (table) and extended (bunk) positions.

As suggested in FIG. 2, it is possible to fold the seat back 14 forwardly until it overlies the seat cushion 12 and assumes a "table" position, in which the seat back 14 lies substantially horizontally.

Figure 3:
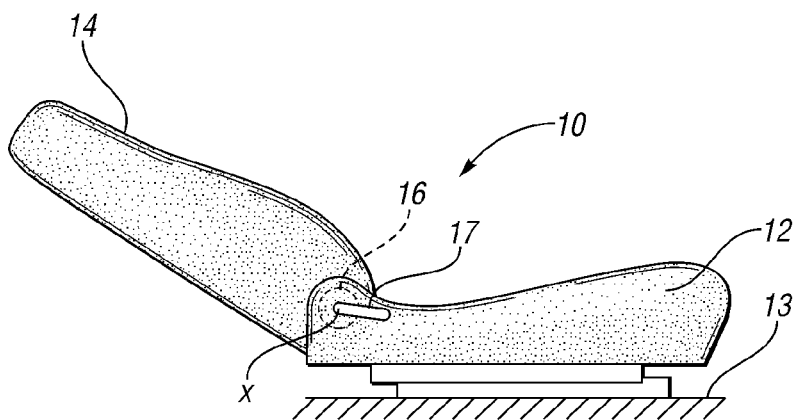

FIG. 3 depicts a condition in which the seat back 14 is tilted rearwardly until it reaches a recumbent position in which the seat back 14 is substantially horizontal.

Absent the influence of one or more torsion bars, the seat back 14 can thus freely pivot relative to the seat cushion 12 over an angular range between the seat back positions depicted in FIGS. 2 and 3.

Figure 4:
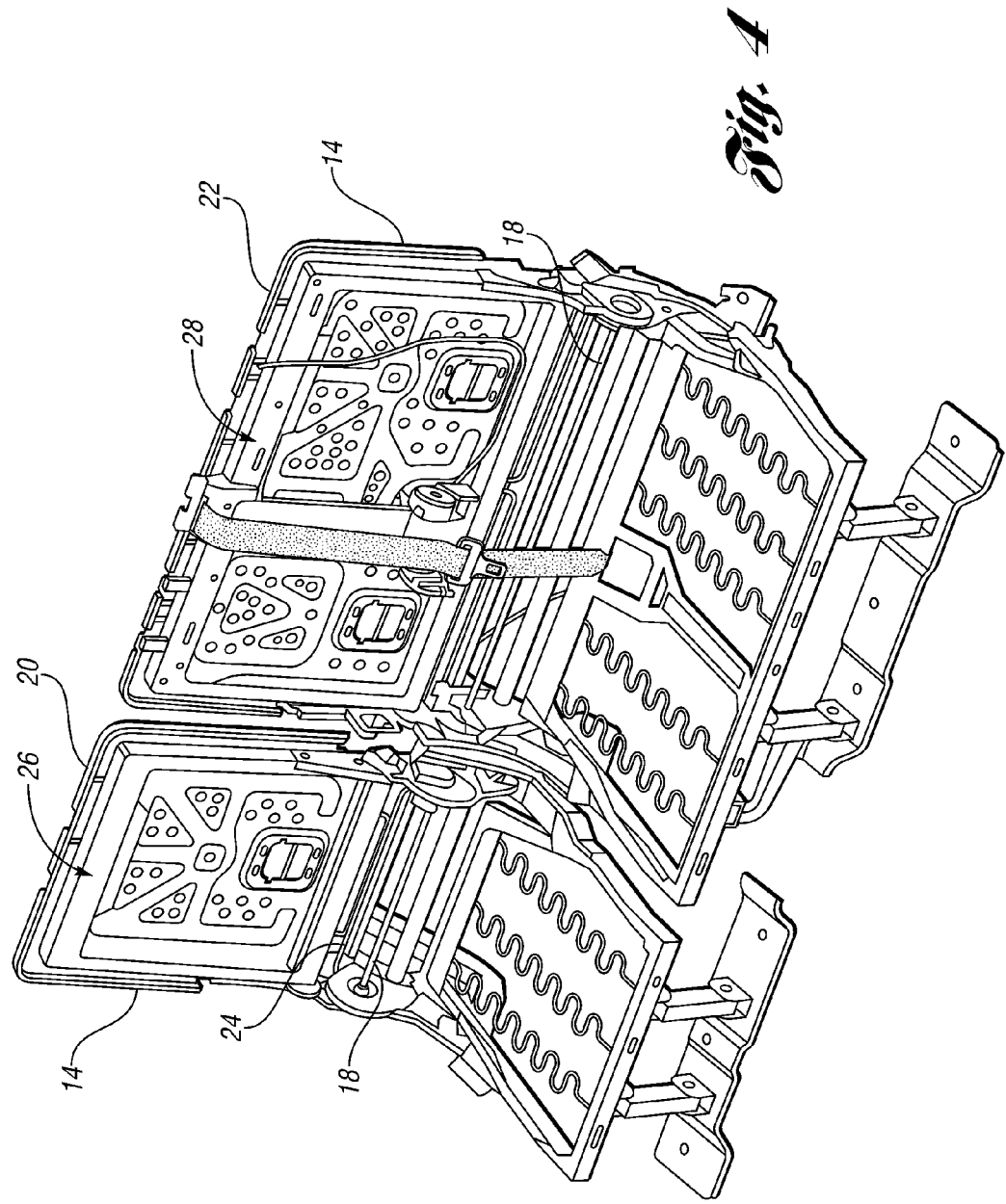
FIG. 4 is a perspective view of the framework of two seat configurations that accommodate alternate embodiments of the invention.

FIG. 4 depicts a pair of seat assemblies 20 (40%), 22 (60%) that form a bench, although the invention is not so limited. The seating configuration depicted includes a 40% (left) and 60% (right) side. Seat backs 14 of the seat assemblies may move independently of each other. One or each of the seat assemblies 20, 22 in FIG. 4 include a torsion bar subassembly 18 which urges a seat back forwardly for only a limited extent $0<\theta<30$ degrees of arcuate displacement. Thereafter, the seat back 14 may pivot downwardly under the influence of gravity, as modified by surface friction between the seating materials of the seat back 14 and cushion 12.

In one embodiment, the torsion bar subassembly 18 includes (FIG. 5) a pair of wires 24, 26 (preferred on the 40% side) or a single wire 28 (preferred on the 60% side).

Figure 5:
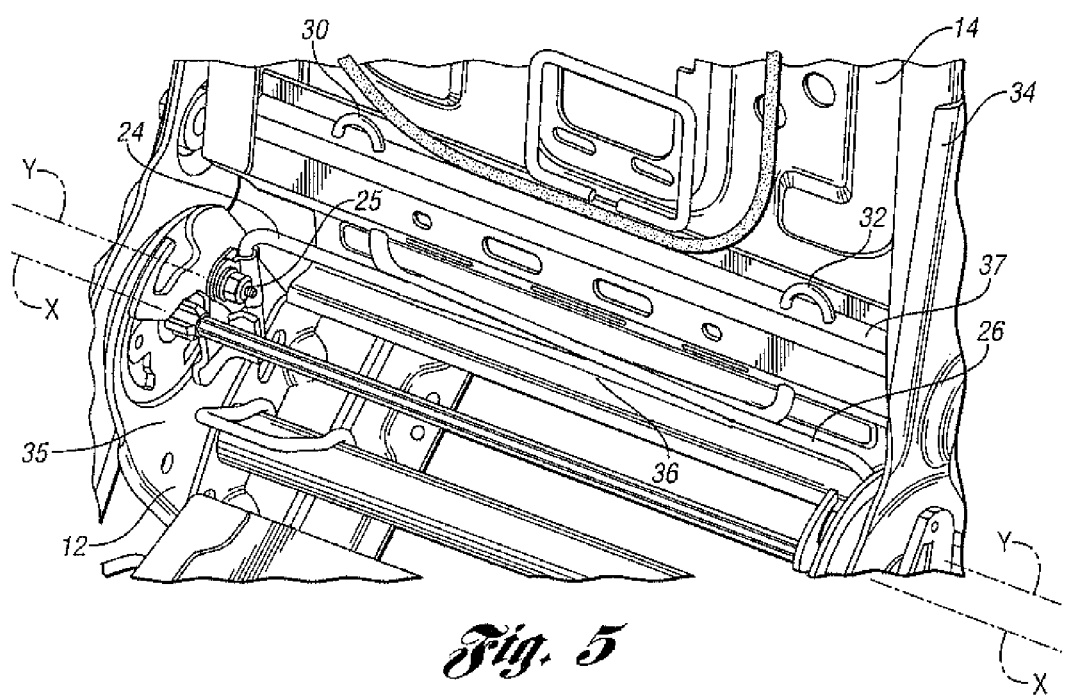
FIGS. 5 and 6 are detailed views of torsion bar subassemblies installed in the seat assemblies of FIG. 4.
Figure 6:
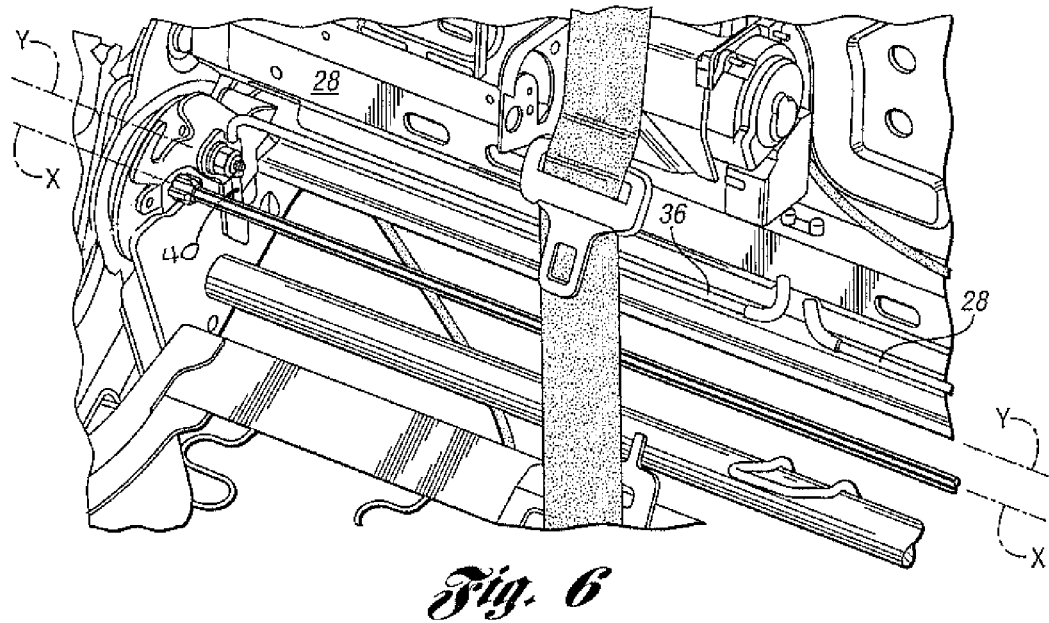

Each wire 24, 26, 28 is preferably made of metal, and is generally made of steel, although other suitable materials could be deployed. In one embodiment, a length of wire extends between two ends 30 and 32 that are fixed rigidly respectively to the framework 34 of the seat back 14 on one side of the seat assembly 20, 22, and to the framework 35 of the seat cushion 12 on the other side of the seat 20, 22. In FIG. 5 for example, the left hand end of bar 24 is secured by a pivot bracket 25 which not only anchors the end of torsion bar 24 but allows it to rotate therewithin during forward and rearward arcuate movement of the seat back 14. Optionally, the pivot bracket 25 is retained by another bracket 27 that in turn is secured to the frame of the seat cushion 12.

Continuing with the reference to FIG. 5, it will be appreciated that the ends 30, 32 are in the embodiment depicted bent around then and retained in the framework 34 of the seat back 14. Optionally, those ends could be secured by having their ends injection molded so that they merely ride atop of an underlying rib structure 37.

In both the 40% and the 60% embodiments, the shared bracketry is deployed, including comparable attachment features and installation method.

Preferably, but not necessarily, the center areas 36 of the 40% springs are coated to minimize noise and vibration. Correspondingly, on the 60% side, there is only one spring 28, so the total length of torsion bar assembly 18 in the 60% embodiment is less than on the 40% embodiment.

More precisely, each torsion bar subassembly 18 comprises a central portion 36 which extends substantially parallel to a seat assembly pivot axis X-X over substantially the entire width of the seat assembly 20, 22. Each torsion bar 24, 26, 28 is terminated by two lever arms 38 and 40 each of which extend substantially perpendicularly to the central portion 36.

In one embodiment of seat assembly 20 (e.g., the 40% side), between the central portions 36 and the lever arm 38, the torsion bars 24, 26 wrap around each other for about one turn about an axis Y-Y that is located rearwardly of seat assembly axis X-X.

Advantageously, the wrapped bars 24, 26 (in the 40% embodiment) exert a forwardly acting force on the seat back 14 as it pivots forwardly for an arcuate travel (A) of up to about 20-30 degrees. Thereafter, the influence of the torsion bar subassembly 18 diminishes. The seat back 14 may then continue its downward travel under the influence of gravity.

In a particular embodiment, a metal wire torsion bar 24, 26, 28 has a diameter of 5.70 mm to 6.30 mm and the central portion 36 of the torsion bar may have a length between about 300 cm to 670 cm. In one configuration, a return torque exerted on the seat back on the seat back 14 may be about 90 Nm, over an angular stroke of positions for the seat backs 14 when it lies between a vertical position over the first approximate θ=30 of forward fold before torque is eliminated.

One the 60% side, in some embodiments, a single torsion bar 28 may be deployed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

For convenience, here are the reference numerals used and the components thereby identified:

| Ref No. | Component |
| --- | --- |
| 10 | Motor vehicle seat assembly |
| 12 | Seat cushion |
| 13 | Vehicle floor |
| 14 | Seat back |
| 15 | Arrow |
| 16 | Recliner mechanism |
| 17 | Handle |
| 18 | Torsion bar subassembly |
| 20 | Seat assembly (40%) |
| 22 | Seat assembly (60%) |
| 24 | One wire in a pair (18) |
| 25 | Pivot bracket |
| 26 | One wire in a pair |
| 27 | Bracket |
| 28 | Single wire |
| 30 | End |
| 32 | End |
| 34 | Framework |
| 35 | Framework of seat cushion |
| 36 | Central portion |
| 37 | Rib structure |
| 38 | Lever arc |
| 40 | Lever arc |

What is claimed is:

1. A vehicle seat having two opposite sides,
  a seat back mounted on a seat cushion to pivot about a transverse horizontal pivot axis X-X by a recliner mechanism that can be moved between
    a locked position in which the recliner mechanism prevents the seat back from moving relative to the seat cushion, and
    an unlocked position in which the recliner mechanism allows the seat back to pivot relative to the seat cushion about the pivot axis, the seat assembly comprising
    a torsion bar subassembly with one or more elongate torsion bars extending along an axis Y-Y at least partially between the opposite sides,
  each bar of the torsion bar subassembly having
    an end affixed to one of the seat back and the seat cushion and
    another end affixed respectively to the seat cushion and the seat back so that the torsion bar subassembly exerts a forwardly directed force on the seat back over a limited range of arcuate travel;
  each bar of the torsion bar subassembly having a central portion extending substantially parallel to the pivot axis X-X between first and second lever arms,
  the first lever arm formed at one end of a central portion extending perpendicular thereto and being attached to a seat cushion, and the second lever arm formed at the other end of the central portion also extending perpendicularly thereto and being attached to the seat back,
  each of the first and second lever arms being secured by a pivot bracket that anchors the associated lever arm and allows it to rotate therewithin during forward and rearward arcuate movement of the seat back,
  wherein the axis Y-Y is located rearwardly of axis X-X.

2. A seat according to claim 1, in which the one or more torsion bars is limited to one torsion bar.

3. A seat according to claim 1, in which the one or more torsion bars is limited to two torsion bars.

4. A seat according to claim 3, in which the two torsion bars are wrapped around each other by one turn.

5. A seat according to claim 4, in which each torsion bar lies parallel to the other when the seat back lies in a forward position that is about 30 degrees ahead of a generally vertical position.

6. A seat according to claim 1, in which the seat back is adapted to pivot relative to the seat cushion under the influence of the torsion bar subassembly over a range of zero to about 20 degrees.

7. A seat according to claim 6, in which the seat back is adapted to pivot relative to the seat cushion between a table position in which said back is folded down substantially horizontally over the seat cushion, and a recumbent position in which the back is tilted rearwardly into a substantially horizontal position.

8. A seat according to claim 1, in which the torsion bars are made of steel and have a diameter lying in the range 5.70 mm to 6.30 mm.

\* \* \* \* \*